May 14, 1946. R. REYNOLDS 2,400,317
FISHING REEL
Filed Jan. 18, 1945 2 Sheets-Sheet 1
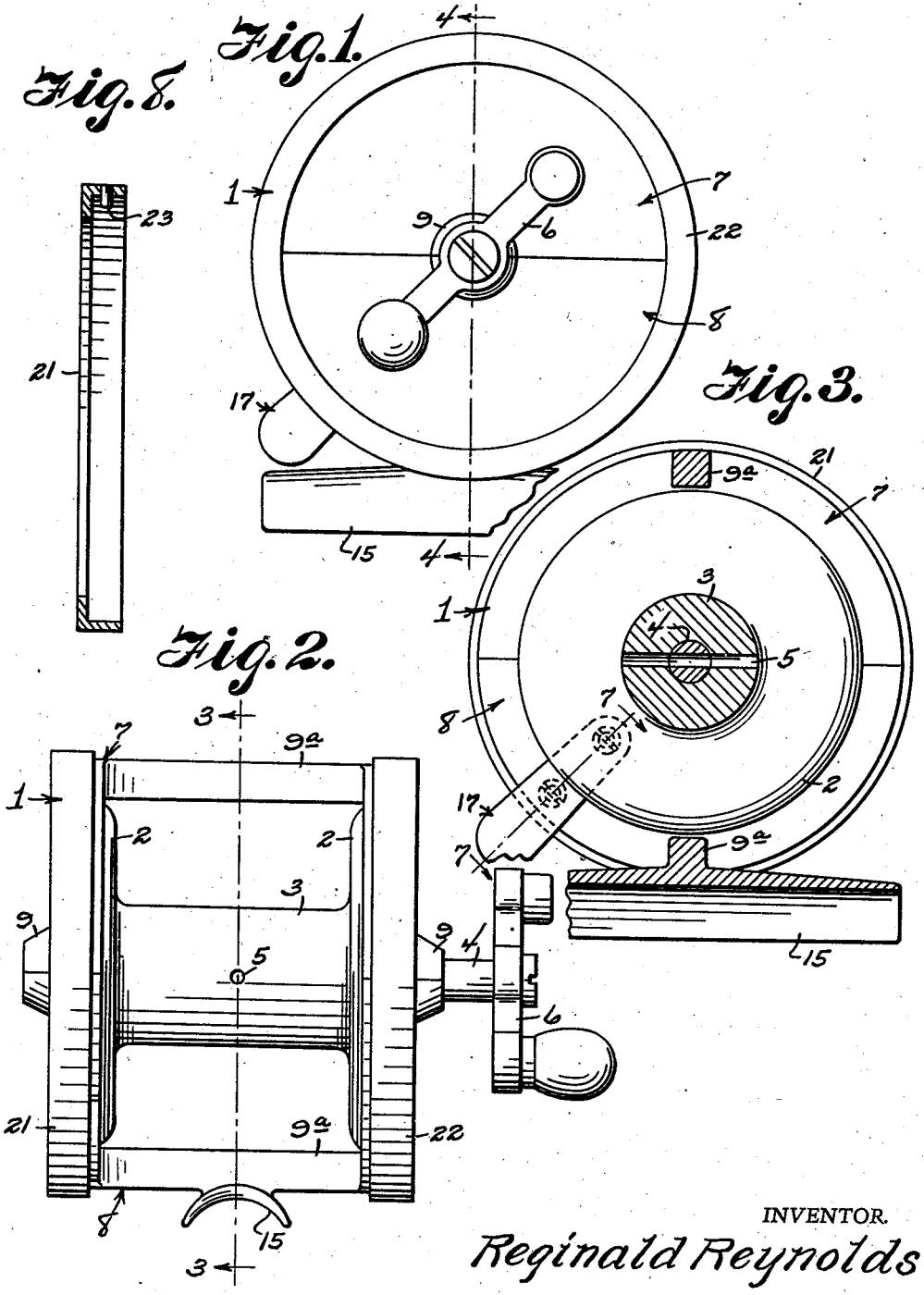
INVENTOR.
Reginald Reynolds
BY Victor J. Evans & Co.
ATTORNEYS May 14, 1946.   R. REYNOLDS   2,400,317
FISHING REEL
Filed Jan. 18, 1945   2 Sheets-Sheet 2
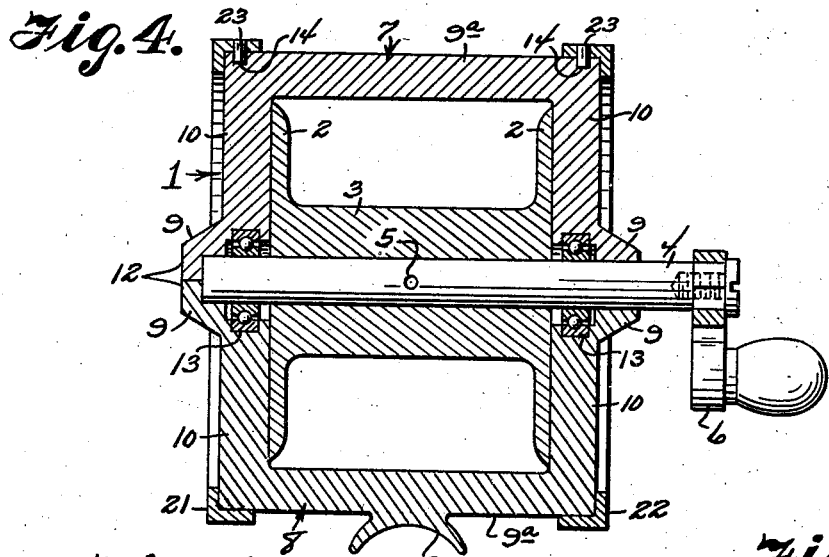
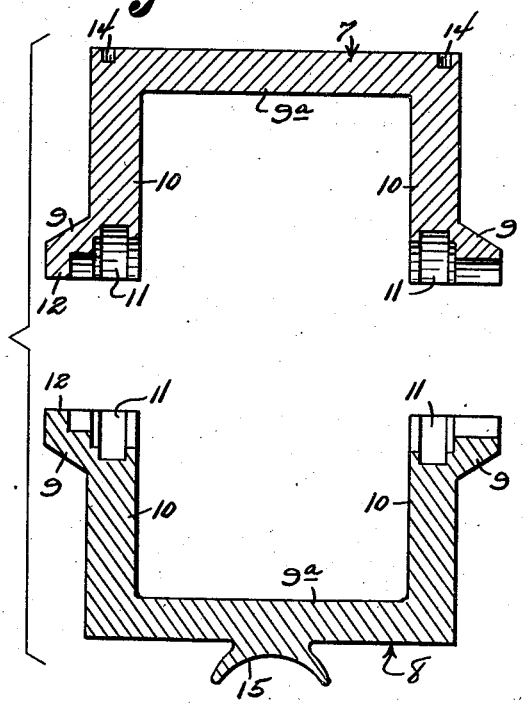
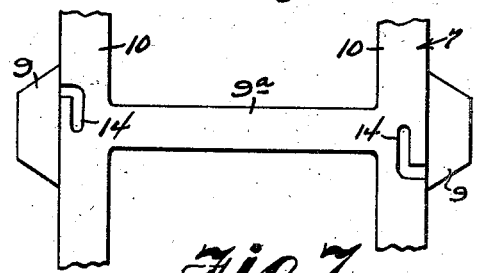
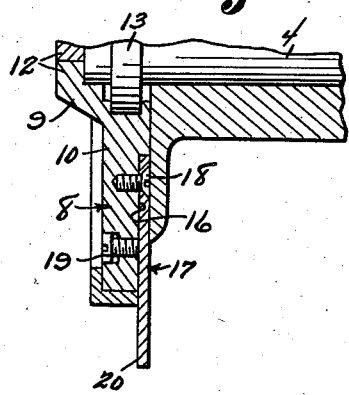
INVENTOR.
Reginald Reynolds
BY Victor J. Evans & Co.
ATTORNEYS Patented May 14, 1946

2,400,317

UNITED STATES PATENT OFFICE 2,400,317

FISHING REEL

Reginald Reynolds, Carpinteria, Calif.

Application January 18, 1945, Serial No. 573,363

2 Claims. (Cl. 242—84.1)

My present invention, in its broad aspects, relates to improvements in fishing reels, and more particularly it is my purpose to provide a reel frame formed with two sections fitting together in a horizontal frame to support the reel assembly—that is a split reel construction—whereby the reel may be quickly taken apart and put together and is easily kept clean. Furthermore, my reel is put together without screws or bolts, has a brake on the left side where it can be handily manipulated while the right hand is occupied in playing a fish, and wherein there are no complicated or intricate parts, and no gears or pinions and the like. My reel may be formed of metal or plastic or other suitable material, and can be kept dry and in proper working condition under hard conditions of use.

Other and equally important objects and advantages of my invention will be apparent from the following description and drawings.

In the drawings wherein I have illustrated a preferred form of my invention—

Figure 1 is a side elevation;

Figure 2 is a front elevation;

Figure 3 is a vertical section;

Figure 4 is a section taken on the line 4—4 of Figure 1;

Figure 5 is a section of the two frames or supporting members;

Figure 6 is a fragmentary plan view showing the bayonet slots for connecting the frame or supporting members together;

Figure 7 is a section on the line 7—7 of Figure 3 and shows the brake, and

Figure 8 is a section through one of my assembling rings.

In the drawings wherein like characters of reference are used to designate like or similar parts—

The numeral 1 designates my spool which has flanges or guards 2 and a hub 3 having a central bore through which the spool shaft 4 extends and is pinned to the hub at 5. The shaft extends beyond both flanges and carries an operating handle 6 on the right hand end.

My upper and lower frame or spool supporting members 7 and 8, respectively, are similar in form and construction, and each has cooperating hub sections 9 and a connecting bar 9ª for the semi-circular ends 10. The right hand hub section 9 is formed with arcute recesses 11 and the shaft extends completely through the hub section. The left hand hub section has arcuate recesses 11 and the outer end is brought down to form a cap or closure 12 for the end of the shaft which does not extend through. The shaft 4 carries ball-bearing assemblies 13 which fit in the arcuate recesses 11 when assembled together as shown in Figure 4.

The top section 7 has opposed bayonet slots 14, and the bottom section 8 a reel seat 15. The left-hand end 10 of the bottom section 8 has a slot 16 in which is fitted a spring brake plate 17 which is attached by a screw 18 and is adjustable by a countersunk screw 19 and extends outwardly as at 20 to provide a finger engaging end.

My frame or supporting members are assembled together as indicated in Figures 4 and 5, to hold the spool rotatably therebetween, and a pair of rings 21 and 22 formed L-shaped in cross-section are each provided with a pin 23 so that when the rings are placed about the sections as in Figures 1, 2 and 3 and 4, and the pins 23 locked in the bayonet slots 14—by giving the rings a slight turn—the spool is completely assembled and the brake plate 17 is positioned on the left side in proximity with the adjacent end plate of the spool, to be moved by the thumb against the reel to brake the same.

From the foregoing it is believed that the operation and advantages of my invention will be apparent, but it is again emphasized that interpretation of the scope of my invention should only be conclusive when made in the light of the subjoined claims.

I claim:

1. A fishing reel comprising a spool body formed with flanges and a hub, a shaft carrying the body and extending out from the sides thereof, and a two part supporting frame formed with similar upper and lower sections fitting together to mount the spool therebetween, each section having cooperating hub parts and cooperating end plates, the end plates of each section being attached together, a cap formed on one of said hub sections, an opening in the other hub section to permit the shaft to extend therethrough, rings mounted on each hub section, said rings being L-shaped in cross section and provided with a pin and said upper frame section being provided with bayonet slots to receive the pins to detachably lock the rings thereon and hold the frame sections together.

2. The invention as defined in claim 1 wherein the shaft carries anti-friction bearing assemblies, and the supporting frame sections are formed with recesses to receive the anti-friction bearing assemblies.

REGINALD REYNOLDS.